US009106602B1

(12) United States Patent  (10) Patent No.: US 9,106,602 B1
Miranda  (45) Date of Patent: Aug. 11, 2015

(54) DIFFERENTIATED DISPLAY OF MESSAGES ON SOCIAL NETWORKS

(75) Inventor: Alberto Alexandre Assis Miranda, Belo Horizonte (BR)

(73) Assignee: Google Inc., Mountain View, CA (US)

( * ) Notice: Subject to any disclaimer, the term of this patent is extended or adjusted under 35 U.S.C. 154(b) by 727 days.

(21) Appl. No.: 13/406,435

(22) Filed: Feb. 27, 2012

Related U.S. Application Data

(60) Provisional application No. 61/569,736, filed on Dec. 12, 2011.

(51) Int. Cl.
*G06F 15/16* (2006.01)
*H04L 12/58* (2006.01)
*G06F 17/30* (2006.01)

(52) U.S. Cl.
CPC .......... *H04L 51/32* (2013.01); *G06F 17/30899* (2013.01)

(58) Field of Classification Search
CPC .......................... H04L 51/32; G06F 17/30899
USPC ......................................................... 709/206
See application file for complete search history.

(56) References Cited

U.S. PATENT DOCUMENTS

| | | | |
|---|---|---|---|
| 7,506,263 B1 * | 3/2009 | Johnston et al. | 715/752 |
| 8,463,252 B1 * | 6/2013 | Kader | 455/415 |
| 2002/0103908 A1 * | 8/2002 | Rouse et al. | 709/227 |
| 2007/0260599 A1 | 11/2007 | McGuire et al. | |
| 2010/0023890 A1 * | 1/2010 | Paalasmaa et al. | 715/826 |
| 2010/0299402 A1 | 11/2010 | Korman et al. | |
| 2010/0318571 A1 | 12/2010 | Pearlman et al. | |
| 2011/0004831 A1 | 1/2011 | Steinberg et al. | |
| 2011/0047117 A1 | 2/2011 | Sinha | |
| 2011/0153421 A1 | 6/2011 | Novikov et al. | |
| 2011/0154220 A1 | 6/2011 | Chunilal | |
| 2012/0143948 A1 * | 6/2012 | Archambault et al. | 709/204 |

OTHER PUBLICATIONS

Ostrow, Adam, "Facebook's Version of the Retweet has Arrived", Mashable—Social Media, Jan. 16, 2010, retrieved from <http://mashable.com/2010/01/16/facebook-via/>.

* cited by examiner

*Primary Examiner* — Larry Donaghue
(74) *Attorney, Agent, or Firm* — McDermott Will & Emery LLP

(57) ABSTRACT

A system and method for providing for display of a message within a social networking website are provided. A message is received and a content type is determined by one of: an identification of the content type by a selection of a sender of the message of either an original content type including original content generated by the sender or generated by a personal contact of the sender or a non-original content type including reproduced content not generated by the sender or not generated by any personal contact of the sender; or an automatic identification of content of the message, the content type identifying the message as original or non-original. The content type is associated with the message and differentiated display of the message is provided based on whether the associated content type identifies the message as original or non-original.

28 Claims, 5 Drawing Sheets

DIFFERENTIATED DISPLAY OF MESSAGES ON SOCIAL NETWORKS

CROSS-REFERENCE TO RELATED APPLICATION

This application claims the benefit of U.S. Provisional Patent Application No. 61/569,736 filed on Dec. 12, 2011, which is incorporated herein by reference in its entirety.

BACKGROUND

1. Field

The present disclosure generally relates to social networking, and more particularly to providing for display of a message within a social networking website.

2. Description of the Related Art

Social networks currently allow users to send, upload, link, create, and share messages with other users. Current networks list the aggregate of received messages from others in the user's network. For example, the messages received by a user of the social network may correspond to a stream in the user's profile.

SUMMARY

The disclosed subject matter relates to a computer-implemented method of providing for the differentiated display of a message within a social networking website. The method may include receiving a message and determining a content type of the message based on at least one of: an identification of the content type by a selection of a sender of the message of either an original content type including original content generated by the sender or generated by a personal contact of the sender or a non-original content type including reproduced content not generated by the sender or not generated by any personal contact of the sender; or an automatic identification of content of the message, the content type identifies the message as original or non-original. The method additionally provides for the association of the content type with the message and provides for the differentiated display of the message based on the content type of original or non-original.

The disclosed subject matter further relates to a system for providing for display of a message within a social networking website. The system includes one or more processor(s) and a memory containing processor-executable instructions. When executed by the processor(s), the system receives a message and determines a content type of the message, the content type identifies the message as either a message in a first group or a message in a second group, the first group corresponds to original content, wherein original content includes original content generated by the sender or generated by a personal contact of the sender and the second group corresponds to non-original content, wherein non-original content includes reproduced content not generated by the sender or not generated by any personal contact of the sender. The system also associates the content type with the message and provides for differentiated display of the message, based on whether the associated content type identifies the message as in the first group or as in the second group.

The disclosed subject matter also relates to a machine-readable storage medium comprising machine-readable instructions for display of a message within a social networking website. The method includes receiving a message and identifying a content type of the message specified by a sender of the message. The method also includes determining the content type of the message by evaluating the content of the message if no content type has been specified by the sender of the message, the content type identifying the message as either original, wherein original includes original content generated by the sender or generated by a personal contact of the sender or non-original, wherein non-original includes reproduced content not generated by the sender or not generated by any personal contact of the sender. The method further includes associating the content type with the message and providing for the differentiated display of the message, based on whether the associated content type identifies the message as original or non-original.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
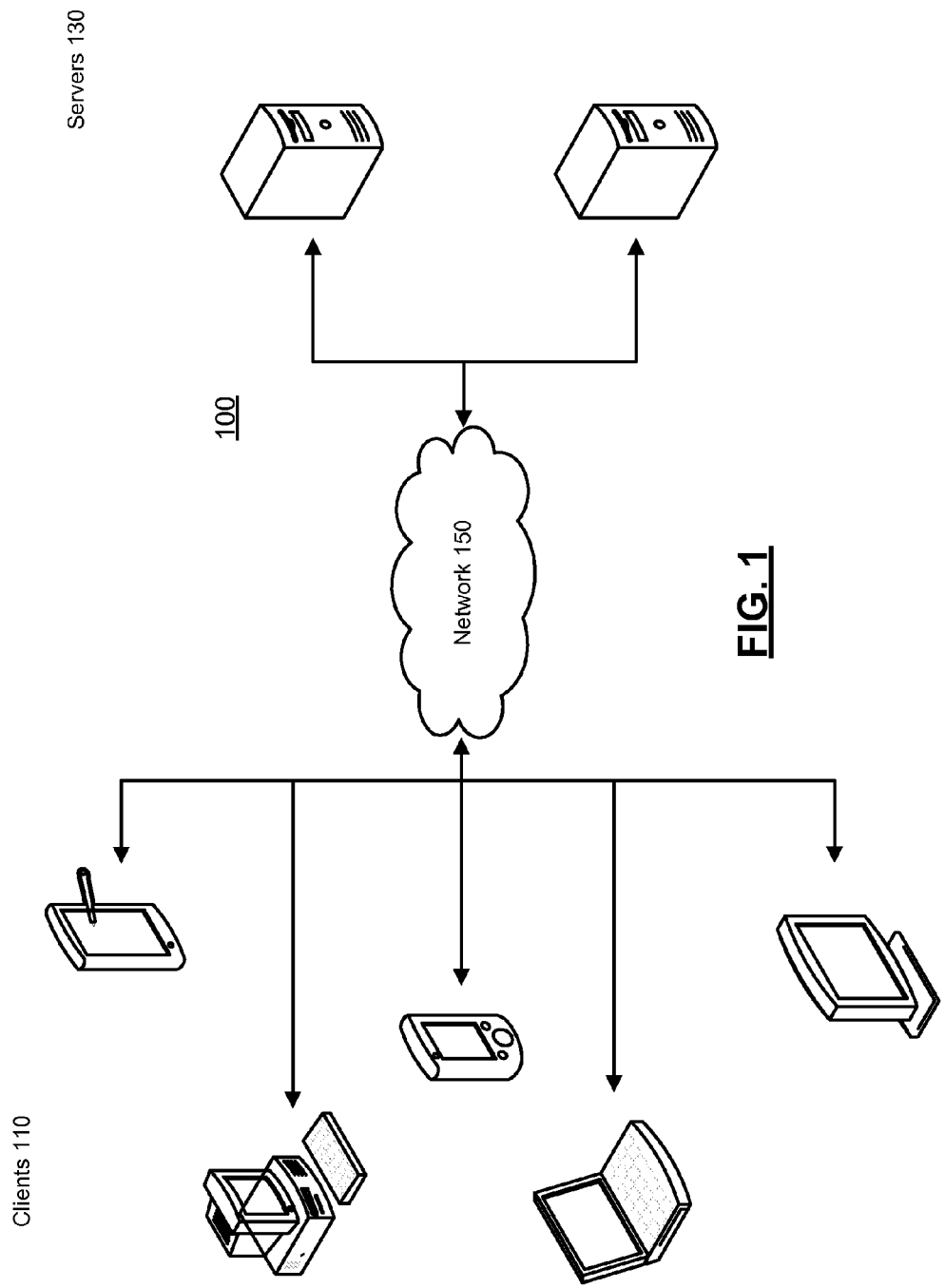
FIG. 1 illustrates an example architecture for providing for display of a message within a social networking website.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The disclosed method describes systems and techniques for display of a message within a social networking website. A message is received. A content type of the message is determined based on at least one of an identification of the content type specified by a sender of the message or an automatic identification of content of the message, the content type identifying the message as original or non-original. The content type is associated with the message. Differentiated display of the message is provided for, based on whether the associated content type identifies the message as original or non-original.

The term "original" in reference to content type as used herein encompasses its plain and ordinary meaning, including but not limited to content that is generated by the sender of the message or content that is generated by a personal contact of the sender of the message. "Generation" of content may be limited to sole, original authorship of the content by the sender, a personal contact of the sender, or a personal contact of the recipient in order for the content of the message to be identified as original. Alternatively, "generation" of content may refer to content that has been edited, augmented, or otherwise changed in some manner by the sender or personal contact of the sender. "Generation" of content may additionally refer to a piece of content that has multiple authors, of which at least one author is the sender or a personal contact of the sender. "Generation" of content does not include content that has been merely reproduced from another source by the sender or a personal contact of the sender.

A personal contact of the sender may be limited to users that are contacts of the sender in the social networking website. A personal contact of the sender may also be a user that is a contact of the sender in another electronic service such as email, calendar applications, other social networking websites, and the like. For purposes of determining "original" content, a personal contact of the sender may include users that are in groups of the sender, or may be an indirect contact of the sender (e.g., the indirect contact, Sally, is a contact of Rajni; Rajni is a contact of the sender of the message, Ricardo; but Sally is not a direct contact of Ricardo). The degree of separation from the sender and the generator of the message may be a threshold to determine original content that is set by user preference or may be preset or controlled by the social network.

Content may include text, images, sound, video, or the like. A hyperlink, URL, or other type of representation of content that is stored apart from the message may be determined as original based on the content to which the representation of content refers. Users may generate original messages that directly relate to the sending of information about a user's life such as messages pertaining to personal invitations, photos of friends or family, or other information directly relating to the sender or receiver's personal life. Users that generate original messages may do so by authoring the pieces of content (e.g., taking a photograph, composing a message, drafting an invitation, recording the user's original song, videotaping a live event such as a birthday party, and the like). A generated piece of content of the user may further be copied into a message from an electronic source, such as an online repository of the user's photographs, a video that has previously been uploaded by the user to a server based on-line storage repository, or a website associated with the user. Generally, these types of messages are intended to impart some information to the recipient regarding the lives of the participants.

In contrast, the term "non-original" in reference to content type as used herein encompasses its plain and ordinary meaning, including but not limited to content that is reproduced content. Reproduced content is content that is not generated by the sender or by a personal contact of the sender. Non-original content may consist of content that is not authored, revised, or augmented by the sender or personal contact of the sender. That is, non-original content is merely reproduced from another source. Other non-original messages may include or consist of content that is not generated by the sending user or personal contact of the sender such as funny videos, a link to a website or game, a news article, or other content that may be generally impersonal in subject matter. Non-original content may be defined as all content that is not original content. These types of messages may be intended to provide the recipients with general amusement or entertainment.

The content type of the entire message may be automatically identified as non-original if any single piece of content contained in the message is non-original. Alternatively, the entire message may be automatically identified as non-original if a specified percentage of the total content of the message is non-original. Similarly, the content type of the entire message may be automatically identified as original if any single piece of content contained in the message is original, or the entire message may be automatically identified as original if a specified percentage of the total content of the message is original.

Social network users may find it advantageous to have their user display differentiate the display of their received messages. Users may then have a more personalized experience with the user's social networking website, and the users may quickly identify the messages that are of interest at a particular time. Users sending messages through a social networking website may also find it advantageous to label the content type of their messages so that personal messages do not get lost among messages sent for idle entertainment. Finally, it may be beneficial to provide a system and method that differentiates types of communication and allows the user greater control in organizing the received messages.

For instance, a sender generates a message that is an invitation to a dinner party. The sender may mark the message as having original content before sending the message. The message is associated with the content type of "original content." If the user has set user preferences to display only original content, the message will appear in the user's display. If the user has set user preferences to display only "non-original content," the message will not appear on the user's display.

As another example, the sender may generate a message that contains a link to a popular website. The method then may use text recognition to determine that the link is "non-original content." The message is labeled as having a content type of non-original content. The receiving user's display will display the message if the user's preference is set to "non-original content only" and also if the user's preference is set to display all content. The message will not appear on the user's display if the user's preferences are set to display only original content.

In yet another example, the sender may forward an invitation to a party that originates from a contact of the receiving user. It is then determined that the message contains original content on the basis of the originating sender's status as a contact of the recipient. The message is then associated with the content type of "original content" and is displayed when the user has specified that original content should be shown.

In yet another example, a sender may forward a message containing a funny photograph downloaded from another website. It is then determined that the photograph is non-original content and the message is associated with that particular content type. The user may have set user preferences to mark each type of content with a different icon or color or may have set the content type to appear in a different location of the display from other content types. The message is then marked according to the user's set preferences and displayed on the user's display.

Turning to the drawings, FIG. 1 illustrates an example architecture 100 for providing for display of a message within a social networking website. The architecture 100 includes clients 110 and servers 130 connected over a network 150.

Each of the clients 110 is configured to download, install, and run a web browser that can access a social networking website as disclosed herein. The web browser is configured to run on clients 110 that can be, for example, desktop computers, laptop computers, mobile devices (e.g., a smartphone, tablet computer, or PDA), set top boxes (e.g., for a television), video game consoles, or any other devices having appropriate processor, memory, and communications capabilities.

The system is comprised of client(s) 110, server(s) 130 and the network 150 in any combination or configuration that facilitates the display of a message within a social networking website. For purposes of load balancing, multiple servers 130 can be used. In certain instances, different versions and/or configurations of the system that include subject technology as disclosed herein are available for download from a server 130 and subsequent installation on client 110. The servers 130 can be any device having an appropriate processor, memory, and communications capability for hosting the data for installing and hosting the system. The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a ring network, a mesh network, a star-bus network, tree or hierarchical network, and the like.

Figure 2:
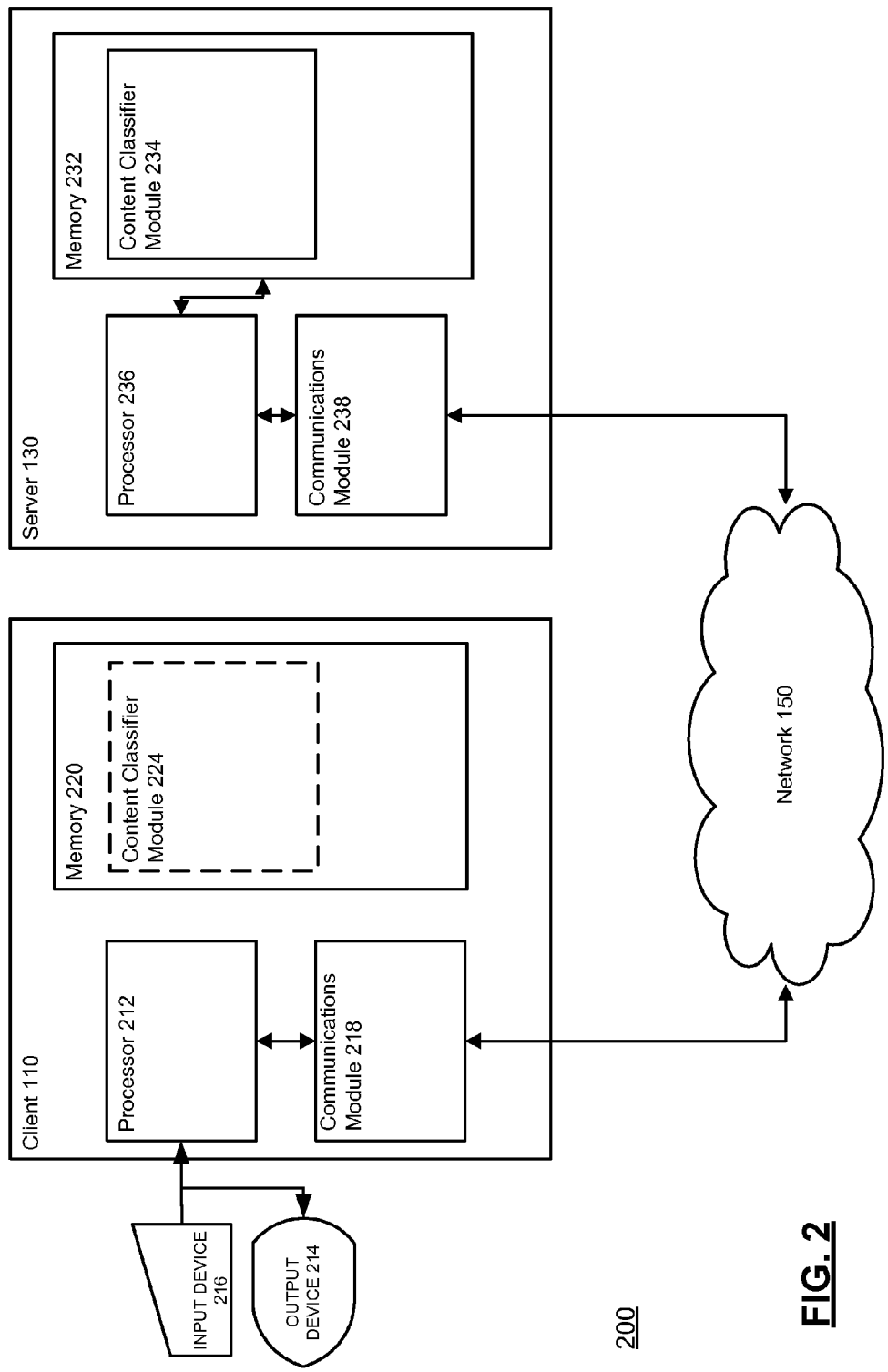
FIG. 2 is a block diagram illustrating an example client and server from the architecture of FIG. 1 according to certain aspects of the disclosure.

FIG. 2 is a block diagram illustrating an example client and server from the architecture 100 of FIG. 1 according to certain aspects of the disclosure. The client 110 and the server 130 are connected over the network 150 via respective communications modules 218 and 238 and are configured to interface with the network 150 to send and receive information, such as data, requests, responses, and commands to other devices on the network. The communications modules 218 and 238 can be, for example, modems or Ethernet cards.

The client 110 includes a processor 212, a communications module 218, and a memory 220 that may include a content classifier module 224. A message may be input by a sender using input device 216 (which may consist of a touchscreen, keyboard, mouse, sensor, or other device), including input regarding the content type of the message. The message is then sent through the network 150 using communications module 218 and processor 212. The content type may further be determined by content classifier module 234 (or alternatively by a content classifier module 224) and assigned to the message. The message may then be sent from server 130 to another client 110 using communications module 238, processor 236 and network 150. Differentiated display of the message may be displayed on output device 214 (e.g., a display) of client 110. Specifically, the server 130 provides the associated content type and the corresponding message to the user's client 110 in response to content information entered or obtained from the sender's client 110.

The processor 212 of the client 110 is configured to execute instructions, such as instructions physically coded into the processor 212, instructions received from software in memory 220, or a combination of both. Processor 236 is configured to execute instructions, such as instructions physically coded into the processor 236, instructions received from software in memory 232, or a combination of both. For example, the input device 216 may provide textual information to processor 212 which is processed by a software module stored in memory 220. The textual information may then be sent through network 150 via communications module 218 to server 130, which receives the information through communications module 238.

Processor 236 processes information from content classifier module 234 and sends information through communications module 238, through network 150, to client 110 to be displayed on output device 214.

Figure 3:
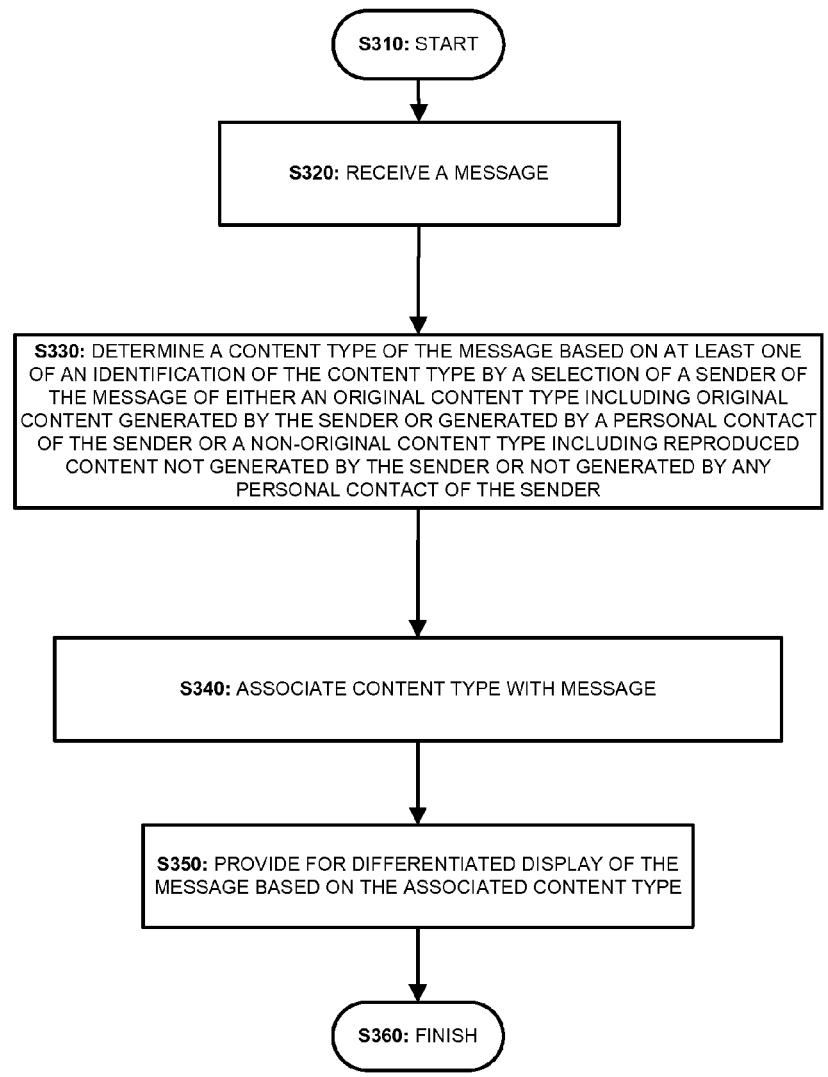
FIG. 3 illustrates an example process for providing for display of a message within a social networking website.

FIG. 3 illustrates an example process 300 for providing for display of a message within a social networking website as shown by the example client 110 and server 130 of FIG. 2 that can provide for display of a message within a social networking website.

Following step 310, in step 320, a message is received by the server 130 from a sender. The sender may send the message from another client 110. The sender may, at the time of sending, designate the content type of the message.

The content type of each message is a criterion by which display of messages are differentiated on the user's display. Content of messages may be grouped in any number of content type groups, and a content type group may be defined by any set of parameters. Two content types may be original and non-original content types. Content that is original may refer to a message that was generated entirely by the sender that is sent directly to the user. Messages that may be associated with an original content type may include invitations to parties; announcement of personal news such as engagements, graduations, trips, other events or occasions; photographs taken by the sender or a person with a personal relationship to the sender. Other original content may include a funny story or joke that is written by, i.e., originates from, the sender.

Content that is non-original may refer to a message that was generated by a user that is not the current sender of the message. The non-original content type may thus refer to an entire message that has been forwarded. Non-original content may refer to content of the message that has been taken from another source. This type of content may include links to webpages, song lyrics that have been copied and pasted, re-telling of a joke, or a photograph that has been taken off another website. Non-original content may include content that is not authored or generated by the sender or a personal contact of the sender. Such non-original content may be considered to be reproduced content.

Content types such as non-original and original may be determined by user input. For example, the user may be prompted to or have the option of designating the type of message that they are sending. Alternatively or additionally, the server 130 or client 110 may determine the content type. To do so, the metadata of the message may be examined or the text contained by the message may be analyzed. Text information inside the message may be analyzed by text recognition that may be related to the frequency with which text strings from the message appear on the internet, the number of times a video or photograph has been viewed, or the like. Hyperlinks in the message may be analyzed for the type of website to which they refer. A personal website link may be categorized as an original content type. The frequency of visits to a website may additionally serve as a criterion for content type categorization.

Information indicating the content type of the message may be contained in the message itself, associated with the message, or stored separately in a table or database that may be accessed by the subject technology. Information may be stored separately from the piece of content or the message on a server. Information indicating the content type of the message may include information associated with the authorship of pieces of content, the source of the content, the source or sources of a message, and the like. Information indicating the content type of the message may indicate that the content type of the message may be different for a selected group of recipients based on the sender of the piece of content.

A single message may have only one content type, or messages may be made of many different content types. Content type may be determined by the content of the message itself, other characteristics of the message, or a combination of the content and other characteristics of the message. For instance, the originating sender may designate the content type by categorizing the message in the sender's user interface while constructing or sending the message. The number of times a message has been forwarded or the other recipients of the message may be determinative of the content type of a message. In this instance, the relationship of the other recipients to the user and/or to the sender of the message may be determining criteria of content type. For example, a message that has been forwarded multiple times may be associated with an original content type if the originating point, i.e. the user who drafted the message, is a current contact of the recipient. A forwarded message that has been forwarded to any number of the user's other contacts may also be designated as original content.

The content type may also be determined by the number of times the message has been forwarded or by other related criteria. For instance, a photograph that has been forwarded several times may initially be determined as original content type until a threshold has been exceeded. The threshold may be a specific number of times that the message has been forwarded. After having been forwarded enough times to exceed the threshold, the photograph may then be designated as non-original content. Content types may be hierarchically determined so that the highest ranking content type determines the content type that is ultimately associated with the message. For instance, content type set by the sender may be the highest rank of content type. Other methods of resolving conflicting content types may also be used. For instance, the originating point may determine the content type of the entire message. Messages that originate from the sender that may be designated as original content type may be redesignated as non-original content type based on the content of the message itself.

In step 330, content type determined manually by the sender or automatically by the server 130 or client 110. The message may be identified by a content type that has been manually specified by the user through a graphical interface in the social networking website. The content type may be automatically identified by server 130 or client 110. Content type of the message may be determined by a combination of both a user specified content type and an automatic identification of the content type based on the contents of the message. For example, the contents of the message may be used to identify the content type of the message only if a content type has not been specified by the user. In another example, multiple content types have been identified, and preference may be given to either a content type manually entered by the user or to content type that has been identified based on the contents of the message. A selection of content type by a sender of the message may require the user to identify the message as one of an original content type or a non-original content type.

The content type is associated with the message in step 340. In step 350, differentiated display of the message is provided based on the associated content type and the process ends in step 360.

Figure 4:
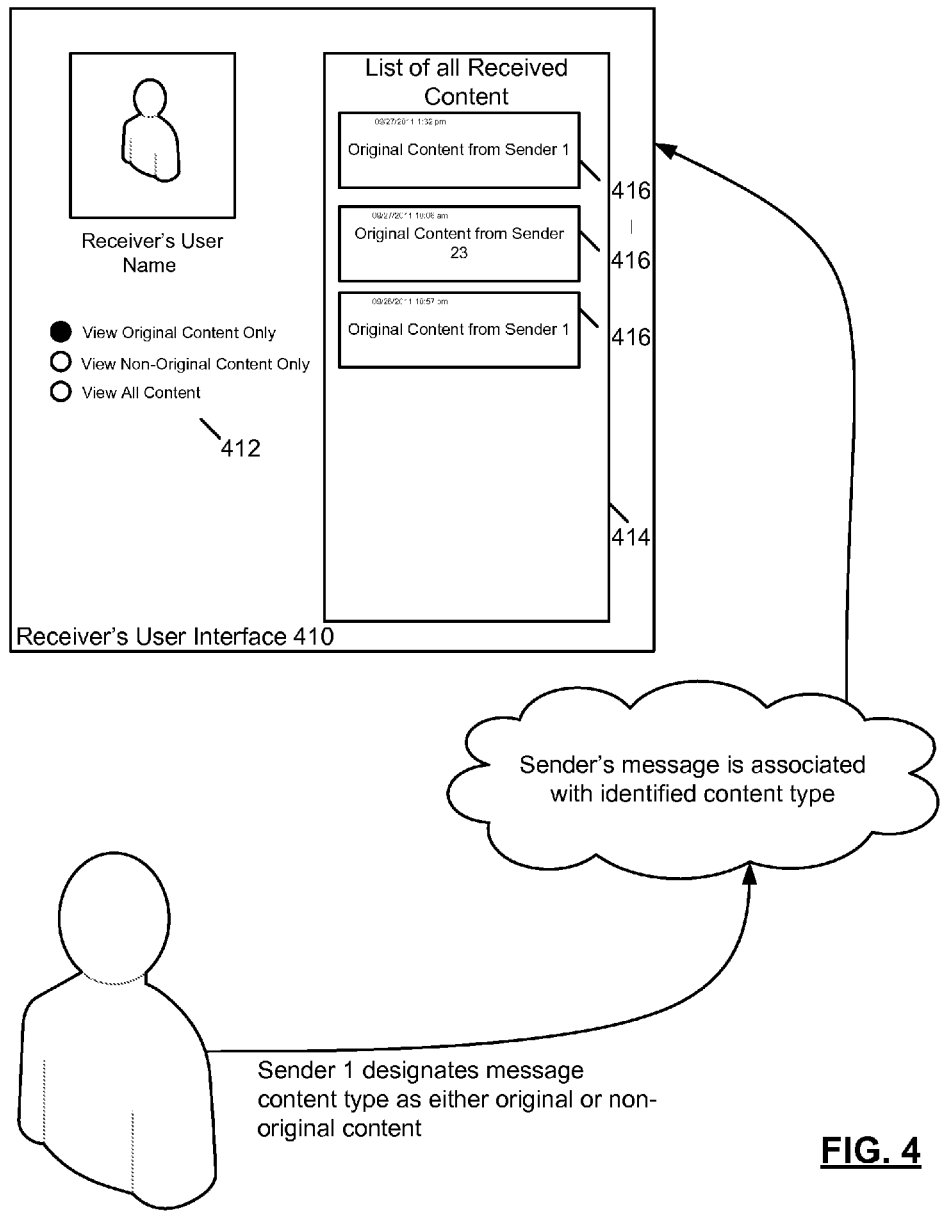
FIG. 4 is an example illustration of a user interface as it relates to one embodiment of the subject disclosure.

FIG. 4 is an example illustration of a user interface as it relates to one embodiment of the subject disclosure.

The user accesses the social networking website on a client 110 through user interface 410. Through the user interface 410, the user may specify preferences in displaying content types of messages through the user preference selection 412. User preference selection options may appear on any portion of the user interface 410 in or associated with the social networking website. As in the example shown, the user may choose to view only messages of a particular content type (here, original content only). Other options illustrated in the example allow the user to specify that only another type of content should be shown, or that all content should be shown.

As another example, the user may select other preferences for differentiated display of messages. As shown in FIG. 4, differentiated display may constitute displaying only one type of content. Additional or alternative differentiation may also be implemented. Content types may be displayed in different colors or with differing backgrounds. An icon may be chosen to indicate one or more types of content. Differentiation may occur by specifying differing areas or order of display. The user may choose any preference or a combination of preferences causing the differentiation. Methods of differentiation may be partially imposed by the social networking site. The user may not choose a preferred display setting, and instead, the social networking site may choose the display configuration and visual identifiers of the different types of content.

In the display configuration of FIG. 4, the user's interface has a portion of the display dedicated to received messages 414. In the chosen display configuration of "View Original Content Only," as chosen by the user preference selection 412, the list of all received content is filtered to show only messages 416 that have been associated with the original message content type.

The association of content type with the message occurs through network 150 and may take place on servers 130. The sender depicted at the bottom of FIG. 4 may send messages and designate message content types through another client 110.

Many of the above-described features and applications are implemented as software processes that are specified as a set of instructions recorded on a computer-readable storage medium (also referred to as computer-readable medium). When these instructions are executed by one or more processing unit(s) (e.g., one or more processors, cores of processors, or other processing units), they cause the processing unit(s) to perform the actions indicated in the instructions. Examples of computer-readable media include, but are not limited to, CD-ROMs, flash drives, RAM chips, hard drives, EPROMs, etc. The computer-readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 5:
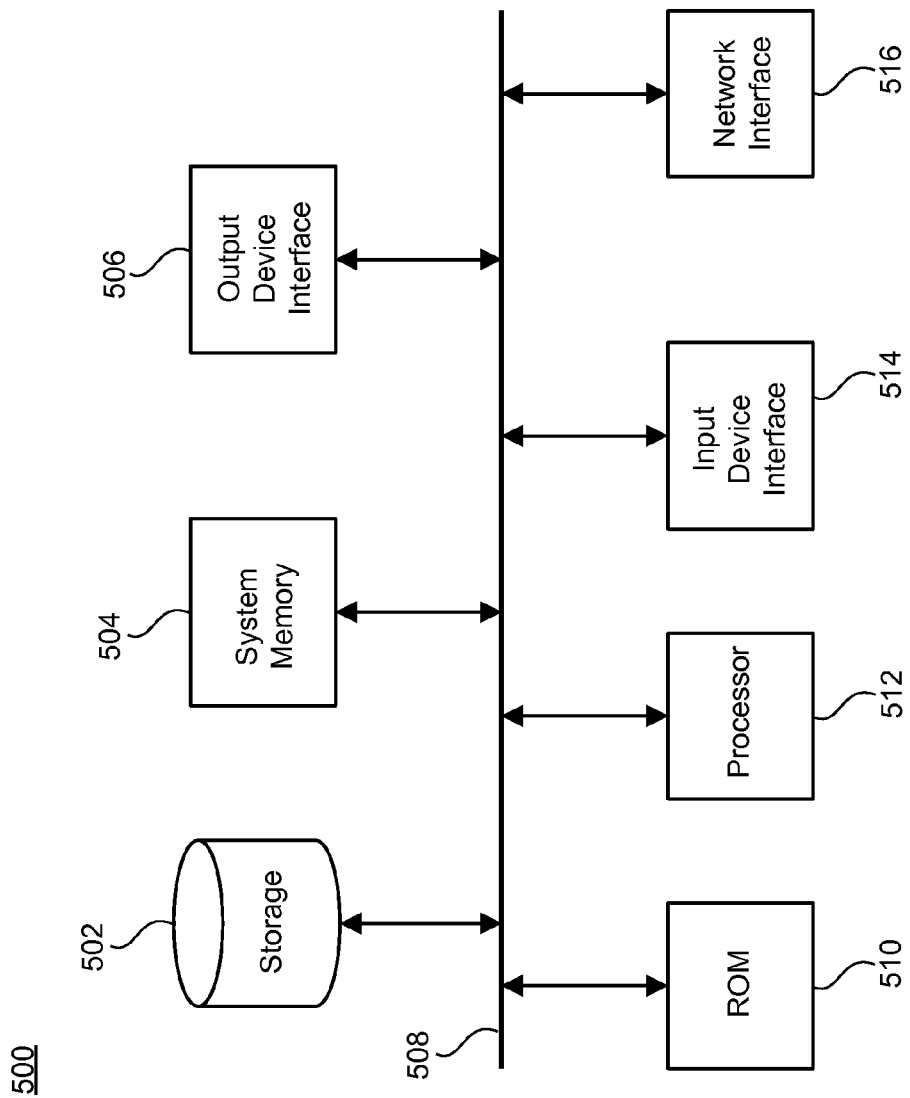
FIG. 5 is a block diagram illustrating an example computer system with which the client and server of FIG. 2 can be implemented.

FIG. 5 conceptually illustrates an electronic system with which some implementations of the subject technology are implemented. Electronic system 500 can be a computer, phone, PDA, or any other sort of electronic device. Such an electronic system includes various types of computer-readable media and interfaces for various other types of computer-readable media. Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such as random access memory. System memory 504 stores some of the instructions and data that the processor needs at runtime. In some implementations, the processes of the subject disclosure are stored in system memory 504, permanent storage device 502, and/or ROM 510. For example, the various memory units include instructions for providing for display of a message within a social networking website in accordance with some implementations. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interface 506 enables, for example, the display of images generated by the electronic system 500. Output devices used with output device interface 506 include, for example, printers and display devices, such as cathode ray tubes (CRT) or liquid crystal displays (LCD). Some implementations include devices such as a touchscreen that functions as both input and output devices.

Finally, as shown in FIG. 5, bus 508 also couples electronic system 500 to a network (not shown) through a network interface 516. In this manner, the computer can be a part of a network of computers such as a local area network ("LAN"), a wide area network ("WAN"), or an Intranet, or a network of networks, such as the Internet. Any or all components of electronic system 500 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessors or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer-readable medium" and "computer-readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims.

What is claimed is:

1. A computer-implemented method of providing for display of a message within a social networking website, the method comprising:
   receiving a message;
   determining a content type of the message based on at least one of an identification of the content type by a selection of a sender of the message of either an original content type including original content generated by the sender or generated by a personal contact of the sender or a non-original content type including reproduced content not generated by the sender or not generated by any personal contact of the sender or an automatic identification of content of the message, the content type identifying the message as original or non-original;
   associating the content type with the message; and
   providing for differentiated display of the message, based on whether the associated content type identifies the message as original or non-original.

2. The method of claim 1, wherein the content type is determined by content of the message automatically identified by text recognition.

3. The method of claim 1, wherein the content type is determined by content of the message automatically identified by an origination point of the message.

4. The method of claim 1, wherein personal messages, personal announcements, invitations, and photographs taken by the sender of the message are content types that identify the content of the message as original.

5. The method of claim 1, wherein forwarded messages, messages containing forwarded content, and photographs taken from a website are content types that identify the content of the message as non-original.

6. The method of claim 1, wherein determining a content type based on an identification of content of the message further comprises:
automatically identifying a forwarded message that originates from a preexisting contact of a user as a content type that identifies the message as original.

7. The method of claim 1, further comprising:
receiving a user preference to display only the messages identified as original, wherein the providing for the differentiated display of the method provides for displaying only the messages identified as original in response to the received user preference.

8. The method of claim 1, further comprising:
receiving a user preference to display only the messages identified as non-original, wherein the providing for the differentiated display of the message provides for displaying only the messages identified as non-original in response to the received user preference.

9. The method of claim 1, wherein the providing for the differentiated display of the message provides for displaying the messages identified as original and the messages identified as non-original in different portions of a user interface of the social networking website.

10. The method of claim 1, wherein an indication of the identification of the content type by the selection of the sender is received via a graphical component.

11. A system for providing for display of a message within a social networking website, the system comprising:
one or more processors; and
a memory containing processor-executable instruction that, when executed by the one or more processors, cause the system to:
receive a message;
determine a content type of the message, the content type identifying the message as either a message in a first group or a message in a second group, the first group corresponding to original content, wherein original content includes original content generated by a sender or generated by a personal contact of the sender and the second group corresponding to non-original content, wherein non-original content includes reproduced content not generated by the sender or not generated by any personal contact of the sender;
associate the content type with the message; and
provide for differentiated display of the message, based on whether the associated content type identifies the message as in the first group or as in the second group.

12. The system of claim 11, wherein the content type is specified by a user of the social networking website.

13. The system of claim 11, wherein the instruction to determine the content type further causes the system to:
evaluate content of the message to determine the content type.

14. The system of claim 11, wherein the content type of the message is determined by text recognition.

15. The system of claim 11, wherein the content type of the message is determined based on an origination point of the message.

16. The system of claim 15, wherein personal messages, personal announcements, invitations, and photographs taken by a sender of the message are determined to be messages in the first group.

17. The system of claim 15, wherein forwarded messages, messages containing forwarded content, and photographs taken from a website are determined to be messages in the second group.

18. The system of claim 15, wherein the instruction to determine further causes the system to:
identify forwarded messages and messages with forwarded content that originate from a preexisting contact of a user; and
reclassify the content type of the messages as messages in the first group.

19. The system of claim 11, wherein the instruction to provide for differentiated display of the message further causes the system to:
receive a user preference to display only the messages identified as in the first group, wherein the instruction to provide for differentiated display of the message provides for displaying only the messages identified as in the first group of messages in response to the received user preference.

20. The system of claim 11, wherein the instruction to provide for differentiated display provides for display of the messages in each group of messages in a different portion of a user interface of the social networking website.

21. A machine-readable storage medium comprising machine-readable instructions, which when executed by a machine cause the machine to perform operations for display of a message within a social networking website, the operations comprising:
receiving a message;
identifying a content type of the message specified by a sender of the message;
determining the content type of the message by evaluating the content of the message if no content type has been specified by the sender of the message, the content type identifying the message as either original, wherein original includes original content generated by the sender or generated by a personal contact of the sender or non-original, wherein non-original includes reproduced content not generated by the sender or not generated by a personal contact of the sender;
associating the content type with the message; and
providing for differentiated display of the message, based on whether the associated content type identifies the message as original or non-original.

22. The machine-readable storage medium of claim 21, wherein the content type of the message is determined by text recognition.

23. The machine-readable storage medium of claim 21, wherein the content type of the message is determined based on an origination point of the message.

24. The machine-readable storage medium of claim 21, wherein personal messages, personal announcements, invitations, and photographs taken by a sender of the message are determined to be original messages.

25. The machine-readable storage medium of claim 21, wherein forwarded messages, messages containing forwarded content, and photographs taken from a website are determined to be non-original messages.

26. The machine-readable storage medium of claim 21, wherein determining further comprises:
identifying a non-original message that originates from a preexisting contact of a user as an original message.

27. The machine-readable storage medium of claim 21, further comprising:
receiving a user preference to display only the messages identified as original, wherein the providing for the differentiated display provides for display of only one content type in response to the received user preference.

28. The machine-readable storage medium of claim 21, wherein the providing for the differentiated display provides for displaying the messages of each content type in a different portion of a user interface of the social networking website.

\* \* \* \* \*